(12) United States Patent
Majumdar

(10) Patent No.: US 10,632,799 B2
(45) Date of Patent: Apr. 28, 2020

(54) FILM TO KEEP TIRE SURFACE CLEAN AND SIMULTANEOUSLY PRIME FOR BETTER ADHESION OF BALANCE PAD

(71) Applicant: Ramendra Nath Majumdar, Hudson, OH (US)

(72) Inventor: Ramendra Nath Majumdar, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 602 days.

(21) Appl. No.: 15/463,669

(22) Filed: Mar. 20, 2017

(65) Prior Publication Data

US 2017/0190218 A1    Jul. 6, 2017

Related U.S. Application Data

(62) Division of application No. 14/302,105, filed on Jun. 11, 2014, now Pat. No. 9,630,457, which is a division
(Continued)

(51) Int. Cl.
*B60C 5/14* (2006.01)
*B60C 19/00* (2006.01)
(Continued)

(52) U.S. Cl.
CPC ........ *B60C 19/003* (2013.01); *B29D 30/0061* (2013.01); *B29D 30/0633* (2013.01);
(Continued)

(58) Field of Classification Search
CPC ......... B60C 1/0008; B60C 5/14; B60C 5/142; B60C 5/145; B60C 5/147; B60C 19/00; B32B 2274/00
See application file for complete search history.

(56) References Cited

U.S. PATENT DOCUMENTS

| 4,017,654 A | 4/1977 | Evans ................ B29C 35/02 |
| 4,106,964 A | 8/1978 | DeVittorio ................ 156/75 |

(Continued)

FOREIGN PATENT DOCUMENTS

| EP | 1435286 | 7/2004 |
| EP | 1426200 | 9/2004 |

(Continued)

OTHER PUBLICATIONS

Table: Glass Transition Temperature of Polymers, Polymer Handbook, 4th ed., John Wiley & Sons, pp. 1-3, 2005.*

(Continued)

*Primary Examiner* — Geoffrey L Knable
(74) *Attorney, Agent, or Firm* — Alvin Rockhill

(57) ABSTRACT

The subject invention relates to a method of preparing a tire inner surface to attain better adhesion of balance pads, puncture sealants, and noise reduction foams. In this method a strip of multi-axially stretchable film is adhered to the inner surface of an uncured tire with a pressure-sensitive adhesive. Then a release agent coating is applied to the film strip on the inner surface of the uncured tire which is subsequently cured in a suitable mold at an elevated temperature. The cured tire is then removed from the mold and after allowing the cured tire to cool the annular circumferential film strip is removed from the inner surface of the tire to provide a circumferential release coating-free tire inner surface onto which balance pads, puncture sealants, and noise reduction foams can be adhered.

19 Claims, 1 Drawing Sheet

Related U.S. Application Data of application No. 12/201,072, filed on Aug. 29, 2008, now Pat. No. 8,776,851.

(51) Int. Cl.

| | | |
|---|---|---|
| *B29D 30/00* | (2006.01) | |
| *B29D 30/06* | (2006.01) | |
| *B32B 25/18* | (2006.01) | |
| *B32B 27/34* | (2006.01) | |
| *B60C 1/00* | (2006.01) | |
| *C08L 23/22* | (2006.01) | |
| *C08L 77/00* | (2006.01) | |
| *B32B 5/02* | (2006.01) | |
| *B32B 5/12* | (2006.01) | |
| *B32B 5/22* | (2006.01) | |
| *B32B 5/26* | (2006.01) | |
| *B32B 7/06* | (2019.01) | |
| *B32B 7/12* | (2006.01) | |
| *B32B 25/04* | (2006.01) | |
| *B32B 25/08* | (2006.01) | |
| *B32B 25/10* | (2006.01) | |
| *B32B 25/12* | (2006.01) | |
| *B32B 27/12* | (2006.01) | |
| *B32B 27/18* | (2006.01) | |
| *B32B 27/22* | (2006.01) | |
| *B32B 1/00* | (2006.01) | |
| *B32B 3/02* | (2006.01) | |

(52) U.S. Cl.
CPC ............ *B29D 30/0662* (2013.01); *B32B 1/00* (2013.01); *B32B 3/02* (2013.01); *B32B 5/022* (2013.01); *B32B 5/12* (2013.01); *B32B 5/22* (2013.01); *B32B 5/26* (2013.01); *B32B 7/06* (2013.01); *B32B 7/12* (2013.01); *B32B 25/042* (2013.01); *B32B 25/08* (2013.01); *B32B 25/10* (2013.01); *B32B 25/12* (2013.01); *B32B 25/18* (2013.01); *B32B 27/12* (2013.01); *B32B 27/18* (2013.01); *B32B 27/22* (2013.01); *B32B 27/34* (2013.01); *B60C 1/0008* (2013.01); *B60C 5/14* (2013.01); *C08L 23/22* (2013.01); *C08L 77/00* (2013.01); *B29D 2030/0077* (2013.01); *B29D 2030/0637* (2013.01); *B32B 2255/10* (2013.01); *B32B 2270/00* (2013.01); *B32B 2274/00* (2013.01); *B32B 2307/306* (2013.01); *B32B 2307/50* (2013.01); *B32B 2307/514* (2013.01); *B32B 2307/54* (2013.01); *B32B 2307/5825* (2013.01); *B32B 2307/718* (2013.01); *B32B 2307/7242* (2013.01); *B32B 2605/00* (2013.01); *B32B 2605/18* (2013.01); *B60C 2005/145* (2013.01); *Y10T 152/10495* (2015.01); *Y10T 428/266* (2015.01); *Y10T 428/2839* (2015.01)

(56) References Cited

U.S. PATENT DOCUMENTS

| | | | |
|---|---|---|---|
| 4,263,074 A | 4/1981 | Price | |
| 4,443,279 A | 4/1984 | Sandstrom | 156/123 |
| 4,616,686 A | 10/1986 | Berta | |
| 4,616,687 A | 10/1986 | Berta | |
| 5,040,583 A | 8/1991 | Lin et al. | |
| 5,156,921 A | 10/1992 | Lin et al. | |
| 5,292,590 A | 3/1994 | Lin et al. | |
| 5,851,323 A | 12/1998 | Kaido et al. | 152/510 |
| 5,879,488 A | 3/1999 | Weston et al. | |
| 6,009,923 A | 1/2000 | Hergenrother et al. | |
| 6,062,283 A | 5/2000 | Watanabe et al. | 152/510 |
| 6,402,867 B1 | 6/2002 | Kaido et al. | |
| 6,524,415 B1 | 2/2003 | Youngman et al. | |
| 6,617,383 B2* | 9/2003 | Ikawa | C08L 77/00 524/167 |
| 6,682,687 B1 | 1/2004 | Mitamura et al. | |
| 6,814,118 B2 | 11/2004 | Narahara et al. | |
| 7,028,555 B1 | 4/2006 | Logan et al. | |
| 7,104,298 B2 | 9/2006 | Starinshak | |
| 7,153,381 B2 | 12/2006 | Majumdar et al. | |
| 7,240,708 B2 | 7/2007 | Nomura et al. | |
| 7,314,533 B2 | 1/2008 | Tanaka | |
| 7,322,876 B2 | 1/2008 | Reppel | |
| 7,329,325 B2 | 2/2008 | Prost | |
| 7,332,047 B2 | 2/2008 | Majumdar et al. | |
| 7,368,024 B2 | 5/2008 | Majumdar et al. | |
| 2001/0041762 A1 | 11/2001 | Ikawa et al. | 524/262 |
| 2004/0095244 A1 | 5/2004 | Conwell et al. | |
| 2004/0103967 A1 | 6/2004 | Majumdar et al. | 152/450 |
| 2004/0140042 A1 | 7/2004 | Teratani et al. | |
| 2005/0155686 A1 | 7/2005 | Yukawa et al. | 152/450 |
| 2006/0096386 A1 | 5/2006 | Logan et al. | |
| 2007/0051453 A1 | 3/2007 | Majumdar et al. | 156/123 |
| 2007/0095458 A1 | 5/2007 | Kanenari | |
| 2008/0047646 A1 | 2/2008 | Hong et al. | |
| 2008/0093012 A1 | 4/2008 | Hasimura | |
| 2008/0314492 A1 | 12/2008 | Tsou et al. | 152/510 |
| 2009/0038728 A1* | 2/2009 | Kanenari | B32B 25/14 152/510 |
| 2009/0084482 A1 | 4/2009 | Majumdar et al. | 152/504 |
| 2009/0114329 A1* | 5/2009 | Tomoi | B29C 33/68 152/510 |

FOREIGN PATENT DOCUMENTS

| | | | |
|---|---|---|---|
| EP | 1762373 | 3/2007 | |
| EP | 2022647 | 2/2009 | |
| WO | WO-2007/043497 A1 * | 4/2007 | ............... B60C 5/14 |
| WO | WO2007050076 | 5/2007 | |
| WO | WO2007050236 | 5/2007 | |
| WO | WO2007070728 | 6/2007 | |
| WO | WO2007129680 | 11/2007 | |

OTHER PUBLICATIONS

MSDS for Dartek Nylon, Dec. 10, 2007.
Carter, et al., Pneumatic Tire and Innerliner and Method for Manufacture, Jul. 1, 2003, U.S. Statutory Invention Registration No. H2068.
Tracey, D.S., Tsou, A. H., Dynamically Vulcanized Alloy Innerliners, Sep. 2007, Rubber World.
Exxonmobil Chemical, ExxonMobil Chemical and Yokohama Rubber Co., Ltd. Achieve Winter Test Qualification for Jointly Developed Advanced Tire Inner Liner, Oct. 5, 2006, News Release exxonmobilchemical.com/Public.sub.--PA.
Tracey, D.S., Dynamically Vulcanized Alloy Innerliners (Tech Service), Sep. 1, 2007, Rubber World, vol. 236, Issue 6, p. 17(5).
Exxonmobil Chemical, ExxonMobil Chemical Company Announces Manufacturing Facility for New Specialty Compounds for Tires, Jun. 19, 2007, News Release, businesswire.com.

* cited by examiner

FILM TO KEEP TIRE SURFACE CLEAN AND SIMULTANEOUSLY PRIME FOR BETTER ADHESION OF BALANCE PAD

This application is a divisional of U.S. patent application Ser. No. 14/302,105, filed on Jun. 11, 2014 (now issued as U.S. Pat. No. 9,630,457 B2), which is a divisional of U.S. patent application Ser. No. 12/201,072, filed on Aug. 29, 2008 (now issued as U.S. Pat. No. 8,776,851 B2). The teachings of U.S. patent application Ser. No. 12/201,072, U.S. patent application Ser. No. 14/302,105, and U.S. Pat. No. 8,776,851 B2 are incorporated herein by reference in their entirety.

FIELD OF THE INVENTION

This invention pertains to the art of methods and apparatuses for preventing surface contamination of a conventional toroidal uncured ("green") carcass of a rubber tire by release agents used in the curing process. More specifically, when the present invention is utilized in the curing of tires, not only are the tire surfaces not contaminated by release agents, but migrated plasticizer or other ingredients from the protective tire film improves the adhesive bond between the tire innerliner and subsequently attached balance pads.

BACKGROUND OF THE INVENTION

It is known in the art that all carcasses of pneumatic green tires are built as a series of layers of flexible high modulus cords encased in a low modulus rubber; the cords in each layer are oriented in a chosen path or direction and substantially equispaced and parallel. Before curing, the tire is often shaped by blowing air inside, and at that time substantial expansion occurs. Components with lower low strain modulus expand easier than components with higher low strain modulus. The tire, whether belted radial ply or bias ply, is cured in a curing press using a curing bladder which forces expansion of the tire. When the carcass is cured with an innerliner in it, as it usually is, the innerliner may further expand with the carcass which is forced against the indentations in the curing mold to form the tread, and all components are co-cured so as to provide a substantially cohesive bond between one and another.

An innerliner for a pneumatic tire is typically formed from either a compound containing a major proportion by weight of a halobutyl rubber, or a compound consisting primarily of all natural rubber. Before the tire is cured, the entire original inner surface of the innerliner and/or the outer surface of a shaping bladder used in the curing press is coated with a release agent. The release agent is commonly referred to as a "lining cement" when used on the surface of the innerliner; and, to a "bladder lube" or "bladder spray" when used on the shaping bladder.

The surface of the innerliner, or the interior surface of an innerliner-free green carcass, or the exterior surface of the tread, or the exterior surface of the sidewall, protected so as never to have come in contact with release agent, is referred to as a "virgin surface" whether it is cured or not. Such a virgin surface permits a rubbery article to be bonded to it without having to clean the surface; in most instances, such bonding to a contaminated surface is typically done after cleaning it, first by scrubbing/buffing with a wire brush in combination with an appropriate solvent, followed by vacuuming the solvent. Such cleaning is necessary to remove the lining cement or bladder spray (release agent), typically an organopolysiloxane or "silicone" based material, such as poly(dimethylsiloxane) including powdered mica or crystalline silica and afford a "cleaned surface". Cleaning is both time-consuming and environmentally unfriendly, since the solvent is non-aqueous and aggressive; moreover, its use is restricted. Nevertheless, before automobile tires are provided with a puncture sealant and/or balance pads, noise-reducing foams are applied to the inner surface of a cured innerliner, it must be thoroughly cleaned. Cleaning to get rid of contaminating release agent so as to provide a "cleaned surface", has been done over several decades, and is still done.

Alternatively, the release agent may be removed by washing with an appropriate detergent, or mechanically, by buffing or abrading the surface until the contaminant is removed. Since tire manufacturers were inured to the disadvantages and additional cost of a cleaning step, they were unaware, until very recently, that bonding a rubbery tire component to a cured virgin surface of a tire provides an unexpectedly stronger bond than bonding to a "cleaned surface", even if it is meticulously buffed and solvent-cleaned.

Providing an uncontaminated tire surface is important because a carcass of a pneumatic rubber tire, whether a radial or bias ply, is often required to have a rubbery component bonded to a portion of the tire's surface, either exteriorly on the sidewall, or internally within the toroid. For example, an aircraft tire, typically of bias ply construction, is dynamically balanced by adhering a laminar pad of rubbery material, referred to as a "balance pad", symmetrically about the circumferential centerline of the interior surface of the cured tire. However, because the precise position at which the balance pad is to be adhesively secured cannot be determined until the tire is cured and dynamically balanced, the circumferential crown area of the entire innerliner is kept clean by the film method as described in U.S. Pat. No. 7,332,047. By definition, the crown area of the innerliner is the portion of the innerliner located underneath the tread.

A balance pad, such as one commercially available from Patch Rubber Company, is a multilayer rubbery component which typically includes (i) a thick layer of high specific gravity compound blended with iron oxide and cured, the thickness and/or area being a function of the weight desired, (ii) a relatively thin layer of high elongation floater gum or stretch ply of rubber filled with carbon black, (iii) a bonding gum layer (also referred to as a "gray-face gum" layer) of curable rubber compound with curing agent but without a cure accelerator or activator fluid, and (iv) a protective film covering the bonding gum layer. When the protective layer is removed from a balance pad of desired weight, and the exposed bonding gum layer is secured with a fast-dry cement containing a cure-accelerator, typically an alkylamine or arylamine, to the rubbery surface of a cured innerliner, or of an innerliner-free cured carcass, the curing of the bonding gum layer to the rubbery surface, typically at ambient temperature over a period of several days, ensures that the balance pad will not be dislodged during operation of the tire. However, since one cannot know in advance where the balance pad will need to be positioned, circumferentially a certain width of the crown area of the innerliner is kept clean.

To protect the entire virgin surface of either a portion of the exterior surface of the tire, or an innerliner, logic dictated that the virgin surface be protected from a conventional release agent in the first place, and that this be done by a removable barrier film between the curing bladder and the virgin surface while the tire was being cured, the barrier film to be readily removable after curing.

The problem in implementing the logical choice, that is, to counter contamination of the entire innerliner surface by the already-present release agent at a temperature in the range at which the tire is to be cured; in some instances only a minor portion of the innerliner may need to be protected. Choice of a barrier film dictated that it be heat-resistant in that temperature range, typically from about 121° C. (250° F.) to 200° C. (392° F.).

Further, expansion of a green carcass in the curing press dictates that, to protect a major portion of the innerliner's surface, the barrier film be extensible at least 2% at curing temperature in any direction on the surface the barrier film is to protect, and to stretch during curing without tearing. A green belted radial ply tire for an automobile expands in the curing press in a range from about 1% to 20%; a conventional green cross bias casing of a bias ply tire with a crown angle in the range from 20° to 38° expands in the curing press in a range from about 20% to 250%, expansion of aircraft tires being greatest. Therefore, a usable barrier film is required to be adequately expandable within the curing carcass, that is, multiaxially or uniaxially expandable, without tearing in the range from about 5% to 100%. The barrier film is also required to be adequately thermoformable, in that it conforms to the shape of the bladder during curing, thus squeezing out entrapped air, and after being thermoformed the film substantially retains its formed shape as the film has essentially no memory and is non-elastomeric. In the instance when the entire virgin surface is to be protected, one end of the barrier is overlapped over the other (which other end is applied or "stitched" to the virgin surface to be protected and secured with a pressure-sensitive adhesive layer at the interface of the overlap) so as to form a "pull-tab" for easy removal.

Still further, since a substantial period of time may elapse before the cured tire is taken up in a production line to have a desired component adhesively secured to it, it is desirable that, before the tire is cured, the barrier film be secured to the virgin surface of the cured tire, whether it has an innerliner or not, sufficiently well that only a small force in the range from about 0.4 to 7.9 N/cm (1 to 20 N/inch) is required to remove the barrier film. Moreover, it is essential that, after the tire is cured, the barrier film remain on the innerliner and not fall off into the tire mold.

Substantially the same problem was addressed in U.S. Pat. No. 4,443,279 to Sandstrom, which was directed to "a pneumatic rubber tire, and method of preparation, characterized by having a co-vulcanized, removable, rubber innerliner adhering to the inner surface of the tire, said innerliner comprised of a sulphur cured carbon black filled rubber compound of (A) butyl rubber and (B) an ethylene/propylene/nonconjugated diene terpolymer. The information further relates to such pneumatic rubber tire in which its exposed inner surface is provided by removal of said innerliner. The information has a particular utility in providing a pneumatic rubber tire with a clean, exposed, inner surface." However, tests indicate that when the illustrative example was duplicated the strip was not readily removable (it tore when it was being removed), and when one end of the cured strip overlaps the other, the ends become fused together upon curing and cannot form a pull-tab for manual removal. The major disadvantages of using such a compound is that it needs several Banbury mixing steps, then a calendaring step, and a wrapping film for calendering. Moreover, calendering is difficult, if not impossible, if thickness is less than 30 mil. Thus, when the removable layer is removed, it generates a lot of cured rubber for disposal or waste. Another disadvantage is that it stretches during removal, breaks, and comes out in several pieces.

One skilled in the art will know that films of numerous synthetic resinous compounds such as Mylar® polyester, Saran® (poly(vinyl chloride)-co-vinylidene chloride), cellophane, polyurethane and polyolefins such as polyethylene (PE) and polypropylene (PP), can be "stitched" with varying degrees of success, onto the exterior of, or into the interior of a green tire because the uncured rubber is tacky enough to do so. Even a heavily cured (high cross-link density) strip of rubber may be stitched into, and remains positioned in the interior, though not reliably; and upon curing, the strip is readily removable, but it too-often tears in the mold because it does not expand sufficiently, and is usually removed in pieces; having been rent, it fails to protect the virgin surface from contamination by the bladder lube coated on the curing bladder. Further, if the curing bladder is not coated, it will adhere to the portions of the carcass where tears in the cured strip have occurred, damaging the bladder when the carcass is torn from it.

Even substituting a cured thin first strip for the uncured strip used by Sandstrom, fails to provide an effective barrier layer because the pre-cured strip tears upon removal. Substituting a less heavily cured (lower cross-link density) second strip which will not tear (and is more readily stitched into the interior of the green carcass than the cured), provides the necessary expansion and excellent protection when the tire is cured—but the second strip still adheres to the protected surface too tightly to be removed integrally, and cannot be easily removed.

As shown in U.S. Pat. No. 7,332,047 to Majumdar et al., a barrier film chosen from readily available films of precured and cured rubber, Mylar, Saran, polyurethane, cellophane, PE and PP was ineffective. Though thermally stable at curing temperature, Mylar and cellophane films wrinkle in the mold because they do not expand, and lining cement enters underneath. They are effective only when a portion of the innerliner is to be protected, provided the film stays in position. In practice, the film becomes dislodged and falls off in more than 10% of cured samples which is unacceptable. Saran®, PE, and PP are melts at tire-curing temperature. Hydrogen chloride generated by decomposition of Saran contaminates the mold. A polyurethane strip less than 5 mils thick is too rubbery to pull out off the tire.

An improved barrier film was presented in U.S. Pat. No. 7,332,047, wherein a removable "self-supporting barrier film of non-sulfur vulcanizable, expandable, thermoformable synthetic resinous material" is applied to the surface of the tire innerliner prior to curing to prevent release agents from contaminating the tire's "virgin surface." Unlike compounded rubber barrier of U.S. Pat. No. 4,443,279, one of the major advantages of U.S. Pat. No. 7,332,047 is that the barrier film can be made very thin (e.g. 1 mil) by a single extrusion step, thus significantly reducing the solid waste generated when it is removed and discarded. Due to its high low strain modulus (50% modulus is 35.75 MPa), it does not stretch much during removal and comes out easily in one piece as the tensile strength is high. U.S. Pat. No. 7,332,047 noted that the "adhesion of a cured rubbery component to a virgin surface of rubber never contaminated by the remnants of a release agent (such remnants are left by solvent-cleaning or buffing the release agent off a cured innerliner surface to leave a cleaned surface), is several-fold stronger than a bond of the cured component to the contaminated, then 'cleaned surface.'"

SUMMARY OF THE INVENTION

One of the advantages of this invention over U.S. Pat. No. 7,332,047 is that the applied film has initially low strain modulus (50% modulus is 6 MPa). After curing, ingredients from this film migrate to the innerliner, which resulted in increase of low strain modulus (50% modulus=27.81 MPa) and also increased the tensile strength. Thus, during its removal to expose the "virgin surface," the film does not stretch and come out in one piece. An additional advantage being the migration of plasticizer or other ingredient resulted in priming of the rubber surface for better adhesion of balance pads. The enhancement of adhesion is due to the plasticizer from nylon or some bromobutyl rubber from the blend film.

In this invention, the tire carcass is provided with an adherent, removable, self-supporting solid barrier film or layer of thermoplastic elastomer where the barrier film is made out of a blend of rubber and a thermoplastic or a plasticized thermoplastic ("blend film"), which film protects the original interior rubber surface of the carcass under the film, or the tread under the film, or the sidewalls under the film, from contamination by release agent. In contrast to other films used for the same purpose, discussed in greater detail below, the film of the current invention is easier to apply because of its lower low strain modulus (i.e. 50% modulus); and due to the migration of the plasticizers and/or other ingredient(s), it also primes the surface of all-natural rubber based innerliners, resulting in improved adhesion of balance pads and other inserts. In the blend film, plasticizers and/or other ingredients migrate to the tire innerliner, thus priming its surface for better bonding. Moreover, migration of ingredients makes the blend film stronger and improves low strain modulus to facilitate easy removal.

At least one embodiment of the present invention is: (1) Easier to apply due to its low strain modulus, (2) low strain modulus increases on cure and hence it does not stretch during its removal, (3) tensile strength increases and hence it can be removed in one piece, (4) migrating ingredients improve bonding to other substrates, (5) migration of the components from the blend film makes the film stronger and facilitates easy removal, and (6) migration of the ingredients enhances adhesion of the balance pad.

In plant trials, the properties of 2 mil Dartek® C917 and the blend film were compared, with the results described in Table 1. The blend film was easier to apply due to its lower 50% modulus; the Dartek® film having a 50% modulus of 35.75 MPa, compared to 6 MPa for the blend film. Moreover, after curing the tire, which involved barrier film stretching and plasticizer and/or other ingredient(s) migration, the blend film became desirably stronger—with dramatically improved tensile strength and increase in low strain modulus (i.e. 50% modulus)—and was easily removed from the innerliner in one piece without tearing. Ease of barrier film removal was especially evident when the film had been applied to an innerliner composed of 100 phr all-natural rubber (as shown in Table 1; after removal of film from a tire with all-natural rubber innerliner).

TABLE 1

Film Properties in Machine Direction

| Properties Measured | Control Film 2 mil Dartek ® C9117 | Film of Present Invention 9 mil blend film | Film of Present Invention after removal from cured tires 9 mil blend film |
| --- | --- | --- | --- |
| 50% Modulus (MPa) | 35.75 | 6.00 | 27.81 |
| 100% Modulus (MPa) | 34.42 | 8.02 | 40.33 |
| Tensile (MPa) | 50.04 | 14.20 | 40.93 |
| Elongation (%) | 250.57 | 355 | 102 |

While balance pads are designed to have good adhesion to halobutyl rubber-based innerliners, they typically have very poor adhesion to all-natural rubber-based innerliners, resulting in sporadic separation of the balance pad from the innerliner during use. Plant trials, however, showed that balance pad adhesion to all-natural rubber-based innerliners was significantly enhanced if the innerliner was protected by the application of the blend film prior to curing. As shown in Table 2, balance pad adhesion to a 100 phr all-natural rubber-innerliner is ordinarily only 6 lbs/inch; but innerliners protected by blend film during curing demonstrated adhesion in excess of 20.15 lbs/inch. Moreover, it was unexpectedly found that this improved adhesion was the result of plasticizers and/or other ingredient(s) migrating from the barrier film onto the all-natural rubber-based innerliners during the curing process. These migrated plasticizers and/or other ingredients "primed" the innerliner surface for improved balance pad adhesion. And, the greater the content of all-natural rubber in the innerliner, the faster the rate of migration; with the best adhesion properties being associated with the innerliner with the highest proportions of all-natural rubber.

TABLE 2

Balance Pad Adhesion to Different Aircraft Tire Innerliner Kept Clean by the Film of the Present Invention
(Pulling speed: 50.8 cm/min; utilized fast dry cement and balance pads, both from Patch Rubber Company)

| Tire | A | B | C |
| --- | --- | --- | --- |
| Phr NR in innerliner | 50 | 100 | 20 |
| Balance Pad Adhesion at RT (lbs/inch) | 19.90 | >20.15* | >19.41 |

*Generally this value is 6 lbs/inch for innerliner with 100 phr natural rubber(3). Higher value as the surface is primed by migration of plasticizer and/or other ingredient(s) to innerliner.

According to one embodiment of the invention, a method of balancing a tire comprises the steps of: (A) providing a cured tire having a release coating-free circumferential inner surface; (B) determining at least one location on the circumference of the release coating-free circumferential inner surface of the cured tire for placement of at least one rubber balance pad to balance the tire; (C) adhesively positioning and securing at least one rubber balance pad at the specific location on the circumference of the release coating-free circumferential inner surface of the cured tire; wherein the release coating-free circumferential tire inner surface is prepared by: (a) providing an uncured tire having an inner surface; (b) placing an annular strip of multi-axially stretchable blend film on a circumferential surface of the inner surface, wherein one end of strip overlays the other end of the strip with a pressure sensitive adhesive for easy removal of the strip from the inner surface, and the blend film: (i) has a thickness in the range of 50 to 510 microns (μm); (ii) has a measured weight in the range of 2.8 g/84 square inch to 21.5 g/84 square inch; and (iii) is formable in a temperature range of from about 121° C. to about 200° C. without tearing; (c) applying a release agent coating to the annular, circumferential film strip and the inner surface of the uncured tire; (d) shaping and curing the uncured tire with the release coating on the annular circumferential film strip and inner surface in a suitable mold at an elevated temperature; (e) removing the cured tire from the mold and allowing the cured tire to cool; and, (f) removing the annular circumferential film strip with its release coating to provide a circumferential release coating-free tire inner surface of the cured tire.

According to another embodiment of the invention, a method of balancing a tire comprises the steps of: (A) providing a cured tire having a release coating-free circumferential inner surface primed by migrated plasticizers and/or other ingredient(s); (B) determining at least one location on the circumference of the release coating-free circumferential inner surface of the cured tire for placement of at least one rubber balance pad to balance the tire; (C) adhesively positioning and securing at least one rubber balance pad at the specific location on the circumference of the release coating-free, and migrated plasticizer primed, circumferential inner surface of the cured tire; wherein the release coating-free circumferential tire inner surface is prepared by: (a) providing an uncured tire having an inner surface; (b) placing an annular strip of multi-axially stretchable blend film on a circumferential surface of the inner surface, wherein one end of the strip overlays the other end of the strip and an adhesive at the interface creates a pull tab for removal of the strip from the inner surface, wherein the blend film: (i) has a thickness in the range of 50 to 510 microns (μm); (ii) has a measured weight in the range of 2.8 g/84 square inch to 21.5 g/84 square inch; (iii) is formable in a temperature range of from about 121° C. to about 200° C. without tearing; (c) applying a release agent coating to the annular, circumferential film strip and the inner surface of the uncured tire; (d) shaping and curing the uncured tire with the release coating on the annular circumferential film strip and inner surface in a suitable mold at an elevated temperature; (e) removing the cured tire from the mold and allowing the cured tire to cool; and, (f) removing the annular circumferential film strip with its release coating by use of the pull-tab to provide a circumferential release coating-free tire inner surface of the cured tire.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, at least one embodiment of which will be described in detail in this specification and illustrated in the accompanying drawings which form a part hereof and wherein.

DETAILED DESCRIPTION OF THE INVENTION

Figure 1:
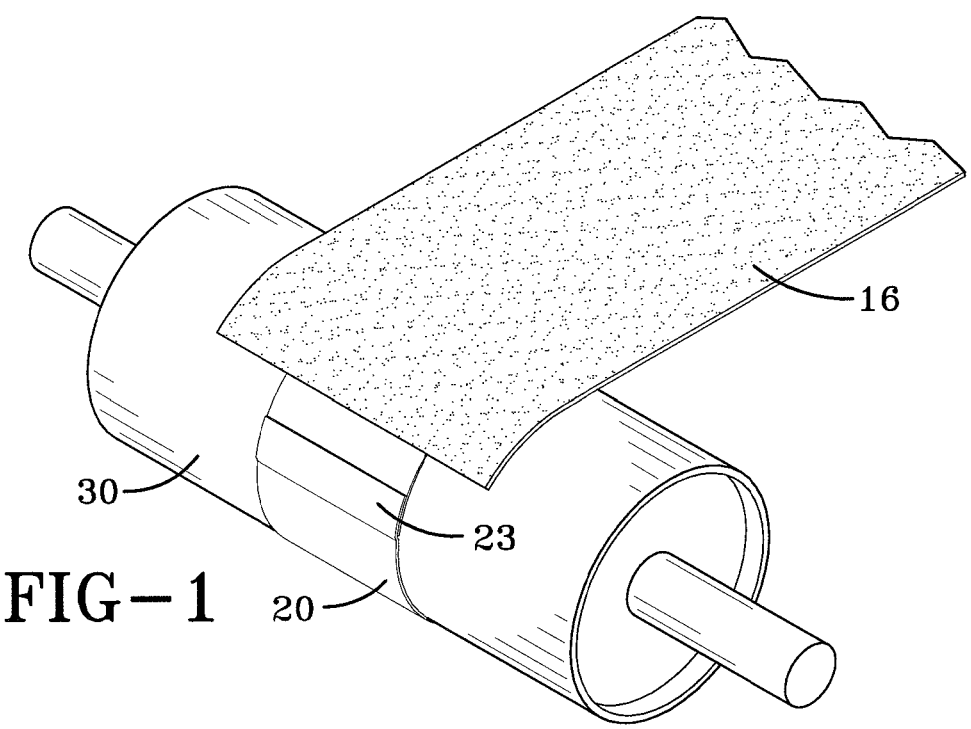
FIG. 1 is a perspective view schematically illustrating positioning of a prepared innerliner (as shown in FIG. 2) on a tire building drum; and, FIG. 2 is a schematic illustration in a perspective view of a tire carcass with a strip of barrier film long enough to provide a "pull-tab", stitched into the innerliner to provide a band of cured virgin innerliner surface within any portion of which a rubbery component may be adhesively secured after the film is removed.

Referring now to the drawings wherein the showings are for purposes of illustrating embodiments of the invention only and not for purposes of limiting the same, as shown in FIG. 1, first a narrow blend film 20 is attached to tire building drum 30 where a portion of overlapped film 23 is attached with a pressure sensitive adhesive at the interface. In this embodiment, the film 20 is a carbon black free material. However, it is to be understood that in another embodiment, no adhesive is needed, as the film 20 could be blown into an annular ring construction.

Figure 2:
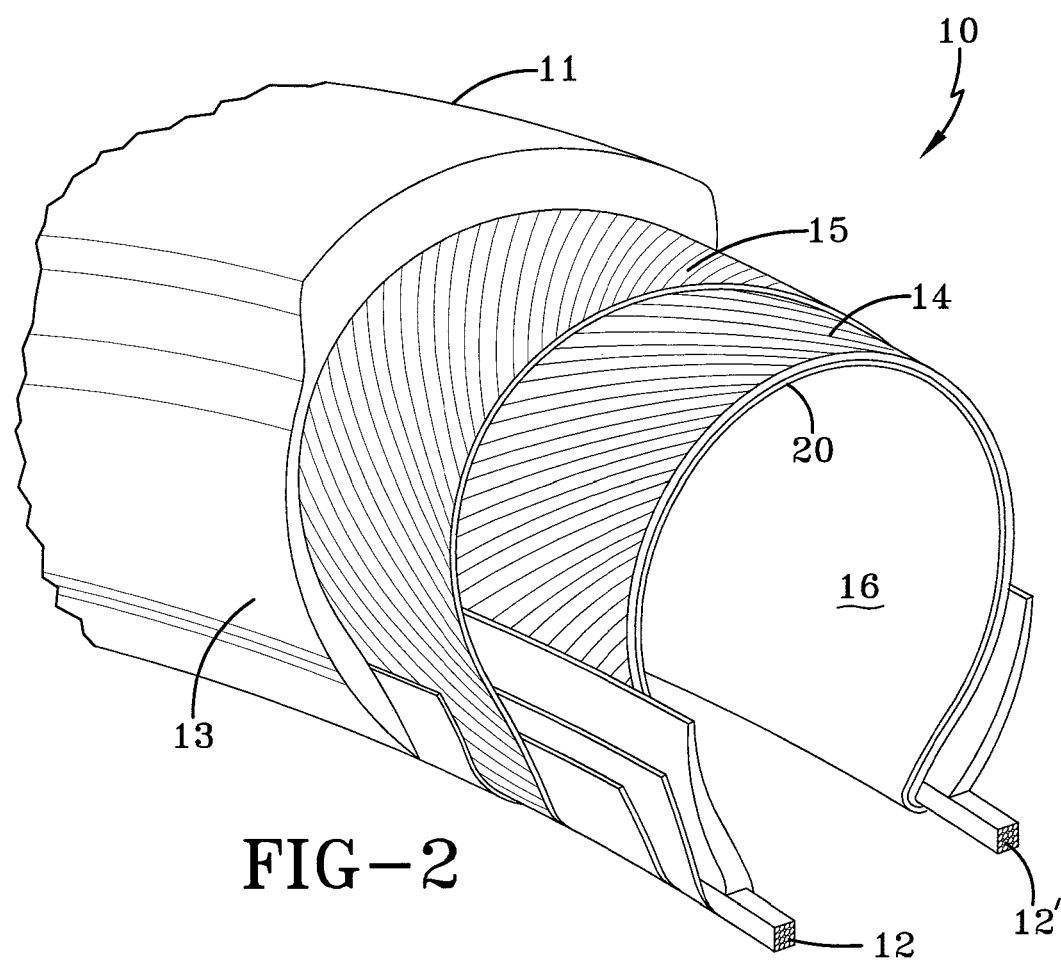

FIG. 2 illustrates a first embodiment of the invention, where there is schematically shown a cross-section of a toroidal tire carcass, referred to generally by reference numeral 10, comprising a circumferential tread 11, spaced beads 12, 12' and connecting sidewall portions 13, 13' (not visible) extending between the tread and beads, to form a conventional cross-bias tire. The carcass 10 includes plural casing plies 14, 15 overlying one another, each having spaced apart parallel reinforcing cords at predetermined angles relative to one another. The inner surface of the innermost belt 14 is lined with a rubber innerliner 16 which is substantially gas-impermeable. The blend film 20 of the present invention, is shown overlying the portion of the surface of the innerliner 16. The components of the tire are assembled on a tire-building drum, the removable blend film 20 being the first component positioned on the drum with a portion overlapped and secured together using a pressure sensitive adhesive.

The green carcass 10 is removed from the drum 30 and stored with the barrier film 20 protecting circumferentially at least a portion of the surface of the innerliner 16. Several days later, the blend film 20 is found to have remained in its original position in the green tire carcass 10. The interior of the carcass 10 is sprayed with lining cement which completely covers the film, and the carcass is placed in a curing press to be conventionally cured. During the conventional curing process, plasticizers and/or other ingredient(s) contained within the blend film 20 migrate onto the innerliner 16. The cured carcass 10 is removed from the press and the film 20 is manually removed in one piece, by pulling on the protruding end of film. The virgin surface, uncontaminated by release agents, but primed by the migration of plasticizers beneath the film is exposed. The migration of plasticizers improves the adhesive properties of the innerliner (as described in greater detail in the background section).

In another embodiment, a strip of barrier film 20 having a width substantially corresponding to the width of the tread 11, is inserted into the carcass 10 and positioned symmetrically about the circumferential center line of the innerliner 16, gently pressing the film 20 against the innerliner 16, so that it is adherently secured to the innerliner 16, and the overlapped portion is attached by a pressure sensitive adhesive. The circumferential edges of the strip 20 are then stitched to the surface of the innerliner 16. The interior of the green carcass 10 with the barrier film 20 in position is then spray-coated with lining cement and the tire cured as before. During the curing process, plasticizers contained within the blend film 20 migrate onto the innerliner 16. When the film 20 is removed, a virgin surface is exposed which is substantially indistinguishable from the virgin surface produced by the prior method of building the tire with the barrier film pre-positioned on the inner-liner, but the latter method is both less cumbersome and less time-consuming.

In another embodiment, a green tire carcass is constructed in a manner analogous to that described above, except that no innerliner is used. The first belt 14 provides the inner surface of an innerliner-free carcass. In a manner analogous to that described for prepositioning the barrier film on the innerliner, the blend film 20 is positioned symmetrically about the longitudinal axis of the first belt 14 and the edges of the film 20 stitched to the rubbery belt. The first belt 14 is then positioned on the building drum so as to provide a pull-tab of film, and construction of the carcass completed in the usual manner. The interior of the green carcass, with the film 20 in position on the innermost belt, is then spray-coated with lining cement and the tire cured as before. During the curing process, plasticizers contained within the blend film 20 migrate onto the innermost belt 16. The cured carcass is removed from the press and the film is manually removed in one piece, by pulling on the protruding end of film. The virgin surface of the innermost belt beneath the film is exposed.

With continuing reference to FIGS. 1 and 2, the building of the tire is accomplished by slipping the blown film cylinder over the tire building drum 30. The carcass 10 is then applied and the two are stitched together. The remaining steps follow the typical tire building process.

The blend film 20 is composed of nylon or plasticized nylon and rubber. In one embodiment, the rubber is at least approximately 30% by weight, and in another embodiment, the rubber is between approximately 30% to approximately 70% by weight, and the nylon is between approximately 30% and approximately 70% by weight. In this embodiment, the rubber can be natural rubber or butyl rubber (polyisobutylene) and the nylon can be nylon 6/66, nylon 6, nylon 6,6, or nylon 12.

An example of the blend film used in this invention is a thermoplastic elastomer from ExxonMobil. The elastomer is at least one halogenated isobutylene-containing elastomer and at least one nylon resin, and a plasticizer suitable for reducing the complex viscosity of the nylon resin. In one example, the isobutylene elastomer is brominated poly(isobutylene-co-p-methylstyrene).

The embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. An annular strip of multi-axially stretchable blend film on an associated circumferential surface of an associated release coating-free circumferential inner surface of an associated tire, the annular strip comprising:
the blend film having a thickness in a range of about 50 to about 510 microns and having a measured weight in the range of about 2.8 g/84 square inch to about 21.5 g/84 square inch, wherein the blend film is formable in a temperature range of about 121° C. to about 200° C. without tearing and fusing to itself if a pressure sensitive adhesive is placed at an interface, wherein the blend film is non-elastomeric in a sense of not returning to its original length when stretched more than about 50 percent of its original length at about 23° C., and wherein the blend film is comprised of about 30 weight percent to about 70 weight percent of a rubber and from about 30 weight percent to about 70 weight percent nylon; and a release agent coating, the coating affixed to the annular, circumferential film strip, wherein the blend film has a pull-tab for removal of the blend film from the circumferential inner surface of the associated tire.

2. The annular strip of claim 1 wherein the rubber is butyl rubber.

3. The annular strip of claim 2 wherein the blend film is further comprised of N-butylbenzene sulfonamide.

4. The annular strip of claim 3 wherein the blend film has a thickness which is within the range of about 150 microns to about 510 microns.

5. The annular strip of claim 4 wherein the blend film has a tensile strength which is within the range of about 17 MPa and 41 MPa.

6. The annular strip of claim 1 wherein the blend film has a 50% modulus which is within the range of about 1 MPa and 10 MPa.

7. The annular strip of claim 1 wherein the blend film has a tensile strength which is within the range of about 5 MPa and 50 MPa.

8. The annular strip of claim 1 wherein the blend film has a 50% modulus which is within the range of about 9 MPa and 28 MPa.

9. The annular strip of claim 1 wherein the blend film is a carbon black free extruded film.

10. The annular strip of claim 1 wherein the rubber is natural rubber.

11. The annular strip of claim 1 wherein the rubber is a halogenated isobutylene-containing elastomer.

12. The annular strip of claim 11 wherein the halogenated isobutylene-containing elastomer is a brominated poly(isobutylene-co-p-methylstyrene).

13. The annular strip of claim 1 wherein the nylon is nylon 6/66.

14. The annular strip of claim 1 wherein the nylon is nylon 6.

15. The annular strip of claim 1 wherein the nylon is nylon 6,6.

16. The annular strip of claim 1 wherein the nylon is nylon 12.

17. The annular strip of claim 1 wherein the release agent is an organopolysiloxane based material.

18. The annular strip of claim 1 wherein the release agent is poly(dimethylsiloxane).

19. The annular strip of claim 1 wherein the release agent includes mica or crystalline silica.

* * * * *